United States Patent [19]
Cunningham et al.

[11] 3,889,881
[45] June 17, 1975

[54] LIQUID DISPERSAL APPARATUS

[76] Inventors: Lonnie C. Cunningham, 26 Champions Colony; Thomas P. Travis, 4625 Stillbrooke, both of Houston, Tex. 77000

[22] Filed: May 29, 1974

[21] Appl. No.: 474,246

[52] U.S. Cl. .................. 239/70; 239/93; 239/99; 239/208; 239/533; 239/570
[51] Int. Cl. .................. A01g 27/00; B05b 1/30
[58] Field of Search ............. 239/145, 120, 67–70, 239/86, 93, 94, 99, 200, 208, 209, 570, 533; 417/290, 307

[56] References Cited
UNITED STATES PATENTS

| | | | |
|---|---|---|---|
| 910,400 | 1/1909 | Lischer | 239/208 |
| 1,678,398 | 7/1928 | Lange | 239/533 X |
| 2,149,660 | 3/1939 | Blood | 239/533 X |
| 2,959,360 | 11/1960 | Nichols | 239/93 X |
| 3,352,245 | 11/1967 | Wolff | 239/93 X |
| 3,465,737 | 9/1969 | Dreisin | 417/307 X |
| 3,524,471 | 8/1970 | Bresser | 239/70 X |
| 3,587,978 | 6/1971 | Rollow | 239/70 X |
| 3,818,928 | 6/1974 | Carsten | 239/99 X |
| R27,855 | 12/1973 | Norstrud et al | 239/570 X |

FOREIGN PATENTS OR APPLICATIONS

| | | | |
|---|---|---|---|
| 344,209 | 3/1931 | United Kingdom | 239/86 |

*Primary Examiner*—Robert S. Ward, Jr.
*Attorney, Agent, or Firm*—Bernard A. Reiter

[57] ABSTRACT

An improved liquid distribution apparatus and method in which insecticide, germicide, herbicide, fungicide, or other similar solutions may be atmospherically dispersed into infested or other desired areas by a system of improved atomizing nozzles interconnected with one another through a hydraulic pressurized conduit system carrying the liquid, the conduit system being arranged in closed loop communication with a source of liquid supply, and including mechanisms for maintaining a positive, but variable, pressure in the conduits while providing for intermittent atomized dispersion of the liquid automatically and routinely in a programmable manner.

13 Claims, 4 Drawing Figures

PATENTED JUN 17 1975

3,889,881

SHEET 1

3,889,881

LIQUID DISPERSAL APPARATUS

BACKGROUND OF THE INVENTION

This invention pertains to a system for the distribution of liquids into the environment. More particularly, the invention is directed to an improved apparatus and method for distributing liquid insecticides, germicides, herbicides, fungicides, and other similar solutions into the atmosphere of animal husbandry facilities such as caged chicken houses, stables, and dairies; and also controlled agricultural/horticultural areas such as greenhouses and processing plants such as canneries; and likewise bottling plants and transportation means such as maritime vessels carrying grain, produce, or livestock.

It is commonly known that flies and other insects not only are annoying and unhealthy, but also constitute adverse influences on production yield of laying hens and livestock safety and well being. As example, in the caged chicken houses used widely in the egg production industry flies frequently infest the litter pits beneath the cage rows to such extent that fly larvae is as numerous in the pits as the litter, and the hatching larvae produce such numerous flies as to render conversation between unmasked chicken house coworkers inadvisable. As a result, not only do the laying hens exist in highly unhealthy conditions, but they are continuously disturbed by either the flies or by the constant efforts to keep the litter pits cleaned out and treated. Under these conditions fewer eggs are produced per hen, and hen fatalities are significantly higher than would otherwise be expected. Similarly, beef cattle are known to produce less weight gain when confined to feed lot conditions and subjected to heavy fly concentrations. Also, in the thoroughbred horse industry highly temperamental or nervous animals are frequently encountered, and it is of constant concern to keep these valuable animals quiet to minimize the chance of self injury known to occur periodically should they become persistently pestered by flies or insects. In such an instance the animal can become substantially valueless within moments. Heretofore, managers of industries such as these have commonly distributed about the chicken house, stable or barn an insecticide intended to kill the flies or other insects present. Although in some instances, the insecticide is introduced onto the bird or animal itself, such procedure has generally been undesirable either because the insecticide compound may produce adverse physical consequences to the animal, or even if this is overcome, direct dispersion of the insecticide onto the bird or animal is difficult because of the animal's continued movement. In any event, previously known insecticide distribution systems have been at best, only partially effective in precluding contact between the insect and animal. Once such contact has been made, multiplication of the insect specie has been checked and eradicated only by direct application of insecticide onto the animal. Not only is direct application difficult and undesirable as set forth above, but also especially impractical in the case of small fowl such as chickens.

Recent developments in the insecticide field have made available government approved insecticide solutions which may not only be safely applied directly to the animal or fowl itself, but may be dispersed over its foodstuff and water. These changes in the insecticide field have allowed development of this invention, permitting routine, automatic and programable application of insecticide and related solutions not only to the animal and its immediate surroundings, but throughout the entire space zone within which it is confined. For essentially the system is a space control device that kills all insects in the space controlled and neighboring areas, and precludes further breeding by eliminating the egg laying adult, thereby breaking the insect reproduction cycle.

BRIEF DESCRIPTION OF THE INVENTION

This invention permits the use of insecticide distribution systems directed to the prevention of insects in the first instance, that is, an apparatus and method which act to preclude the deposit of eggs and thereby eliminate growth of larvae on the premises. This is accomplished by dispersing the insecticide liquid into the atmosphere of the barn or other premises so as to produce an inherently incompatible habitat for insect growth and reproduction in the atmosphere and facility in which the animals exist. The problem of killing the insects after they are existent is thus obviated by producing an environment in which the adult insect and reproduction may not viably exist in the first instance. This objective may not be accomplished through any insecticide distribution system which introduces a liquid spray into the environment because the liquid spray, being heavier than the atmosphere, does not permeate the animal's entire living zone, and largely results only in accumulation of the spray upon the floor of the premises. Though this may preclude growth of larvae on the floor, it will readily be recognized that continued operation of the insecticide spray results in animals and floors which are continually wet with insecticides. Cessation of the spraying may be desirable, therefore, not only to allow the environment to dry, but to reduce the effective cost of insecticide distribution on a continuing basis. Upon such cessation, however, it has been found that there promptly reappears the flies or other insects in the atmosphere about the animal, even though the surfaces in the area are still wet with insecticide.

This invention accomplishes effective insect elimination in an enclosed or partially enclosed structure through utilization of a specifically designed programable timing device having performance accuracy in excess of 90% of selected operating time, for intermittent dispersion of atomized insecticide into the atmosphere of the areas to be controlled. The conduit system is of closed loop design and is provided with means for accomplishing a constant positive pressure both before, during, and after the dispersion period. Atomized spray of the insecticide is accomplished through new and improved atomizing nozzles and the positive pressure characteristic that is maintained in the conduit system, even though the system operates intermittently. As a result of the timed, intermittent fogging dispersion of insecticide into the atmosphere a number of features and advantages, neither achieved nor recognized heretofore, have been accomplished. Initially, there is provided an insecticide dispersion apparatus which introduces an insecticide into the atmosphere in such a way as to preclude irritation to animals or birds because of the insufficient concentration of insecticide per unit area of animal surface. This substantially precludes insect presence because the atomized insecticide that condenses on surfaces of the premises and lingers airborne in suspension therein. Also, the atomizing system substantially discourages and generally precludes the visitation of transient insects trespassing into the premises through windows, doors, and other atmospheric entries. Thus, there are accomplished three beneficial results, namely, larvae free surfaces in the premises, an airborne insecticidal fog deterring atmospheric insects, and the lack of animal irritation from insecticide dispersion by use of an insecticide harmless to animals or fowl, even when in relatively concentrated form.

A further feature of the invention resides in an apparatus for dispersing an atomized insecticide throughout a defined atmosphere.

Another advantage resides in an apparatus for dispersing an atomized insecticide throughout a defined atmosphere on an intermittent basis.

Yet another feature and advantage of the invention resides in an insecticide distribution apparatus for dispersing a liquid insecticide, in atomized state in an environment, so that the insecticide in the environment subsists for an extended period of time without gravitating immediately to and accumulating on surfaces in the environment; thereby inhibiting insect invasion on the atmosphere and prohibiting larvae growth on the surfaces both simultaneously.

Yet another feature and advantage of the invention resides in an intermittent insecticide distribution system, actuated by highly accurate timing mechanisms, and which maintains a positive pressure in the distribution conduits, even when insecticide dispersion is not occuring, thus enabling immediate production of atomized insecticide upon actuation of the apparatus while at the same time significantly reducing the cost of insecticide used by reducing the amount used per unit of time, and by eliminating use entirely in between the actual intermittent dispersions.

Still another feature and advantage of the invention resides in an improved insecticide dispersion nozzle for producing relatively high pressure atomization over a relatively wide angle of dispersion.

Still another feature and advantage of the invention resides in an insecticide distribution system in which the system nozzles interconnect with means for maintaining positive conduit pressure so as to instantaneously produce an atomized spray upon actuation of the pumping mechanism, regardless of the number of nozzles interconnected with the insecticide conduits.

Yet another feature and advantage of the invention resides in an insecticide distribution system in which the insecticide conduits, and extending nozzles, are of closed loop design to thereby preclude not only the loss of conduit pressure but also the loss of fluid while simultaneously eliminating the build-up time in line pressure upon actuation of the system.

A still further feature and advantage of the invention resides in an insecticide distribution system applicable to a variety of animal and other environments, whether they be small fowl or large horses, this by reason of mechanical characteristics of the system enabling variable pressure, highly accurate variable intermittent insecticide dispersion times, variable concentrations of insecticide, variable nozzle placement, and variable cycling periods.

These and numerous other features and advantages of the invention will become more readily apparent upon reading of the following detailed specification, claims and drawings, wherein like numerals denote like parts in the several views and wherein:

DETAILED DESCRIPTION

Figure 1:
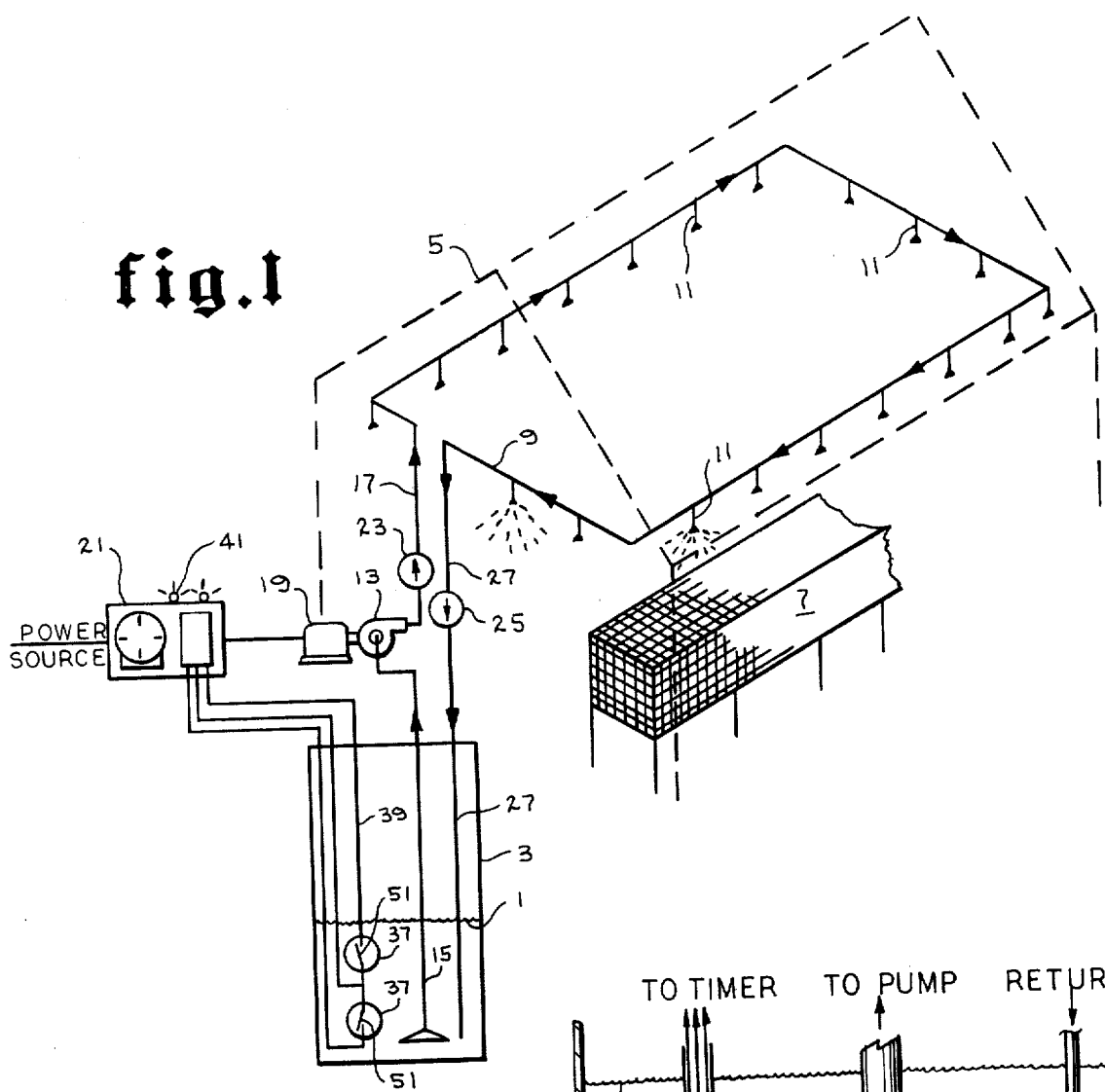
FIG. 1 is a schematic illustration of the improved insecticide distribution system as the same is designed for arrangement in a conventional building layout housing caged chickens.

With reference to FIG. 1 there is shown an exemplary schematic arrangement of the improved insecticide distribution apparatus and the method by which such apparatus is intended to operate. The insecticide, in liquid form, may consist of an appropriate insecticide mixed in water and existing at a given level 1 in the supply container 3. The supply container may constitute a conventional 55 gallon drum, more or less, which is disposed either within or without the building 5 wherein dispersion is to occur. The building 5 may consist of a horse or cattle barn having a plurality of stalls; or it may consist of, for example, a coop housing a plurality of hen cages 7 wherein egg production takes place. There is readily disposed above the cages 7 a conduit line 9 which generally consists of a flexible plastic (nylon) tubing, or like conduit line that is easily affixed by clamps, ties or other appropriate connections to the building structure. The conduit line 9 may be placed in any display pattern within the building and may be readily positioned or repositioned so as to be disposed generally above and in operative communication to areas of the building traversed or occupied by the animals or birds. Fixedly connected to the conduit line 9 are a plurality of nozzle couplings 11 which may likewise be disposed at preselected intervals or distances along the conduit line 9. Liquid insecticide is provided to conduit line 9 from container 3 by a pump means 13 interposed in communicating relation between the suction tube 15 and exit conduit 17. The pump 13 is operated by drive means 19 which may consist of an appropriate motor. The motor is, in turn, operatively connected to an electrical circuit communicating with a solid state timer mechanism 21, the actuation of which is preset and determined in accordance with the operational method described hereinafter. Also disposed in supply relation to conduit line 9, such as in exit conduit 17, is an exit check valve 23 which functions to permit liquid flow only in a liquid exit direction with respect to supply container 3. Similarly, there exists a return check valve 25 between the conduit line 9 and in return relation to supply container 3, such as in return conduit 27. The exit check valve 23 and return check valve 25 operate in conjunction with the intermittent time-driven pump 13 to assure maintenance of a positive pressure in conduit line 9, in accordance with the method of operation described hereafter.

Figure 2:
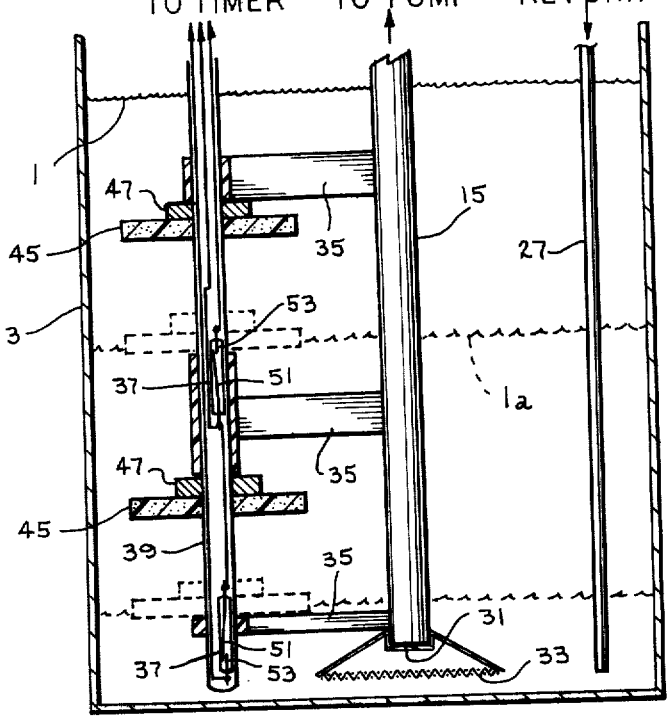
FIG. 2 is a vertical cross section through the insecticide supply tank of the system, generally along the plane 2—2 of FIG. 1.

With attention to FIG. 2 there is shown the enlarged, partial cross section of the supply container 3 of FIG. 1. The suction tube 15 is appropriately supported within the container 3, such as from the lid thereof, and is disposed in fixed relation above the bottom of the container so as to permit efficient induction of the liquid through the lower terminal end 31. An appropriate screen means 33 is affixed to the terminal end 31 of tube 15 for filtering foreign matter and precluding its induction into either pump 13 or line 9. Return conduit 27 from line 9 terminates near the bottom of container 3 so as to produce sufficient turbulence in the container which prevents separation of the insecticide from the liquid. Return conduit 27 is fixedly disposed in relation to tube 15 by conventional standoffs 35. The standoffs serve the same function for the switch 37 within switch tube 39. The switch 37 operates, is connected in circuit to timer 21 so as to turn off or "lock out" the timer when the liquid insecticide recedes to the almost depleted level 1(a) in the container 3. This serves to protect the pump against damage from working dry. It also serves to actuate lights which visually indicate low and empty levels of liquid insecticide in the container.

Disposed in slidably surrounding relation to tube 39 is float 45 of styrofoam or other appropriate material. A ring magnet 47 is disposed in resting relation on float 45. Upward movement of float 45 is limited by contact of ring magnet 47 with standoff 35. Disposed within switch tube 39 is the spring loaded circuit wires which form contacts 51 and 53. As the liquid insecticide level 1 is reduced as a consequence of dispersion through the nozzles, the level eventually reaches the upper limiting position of float 45. As the liquid level continues to drop, the float 45 and the magnet 47 resting thereon move lower in the container 3. In due course the ring magnet 47 reaches the level 1(a) thereby opening the circuit 51, 53 and lock out timer 21.

Figure 3:
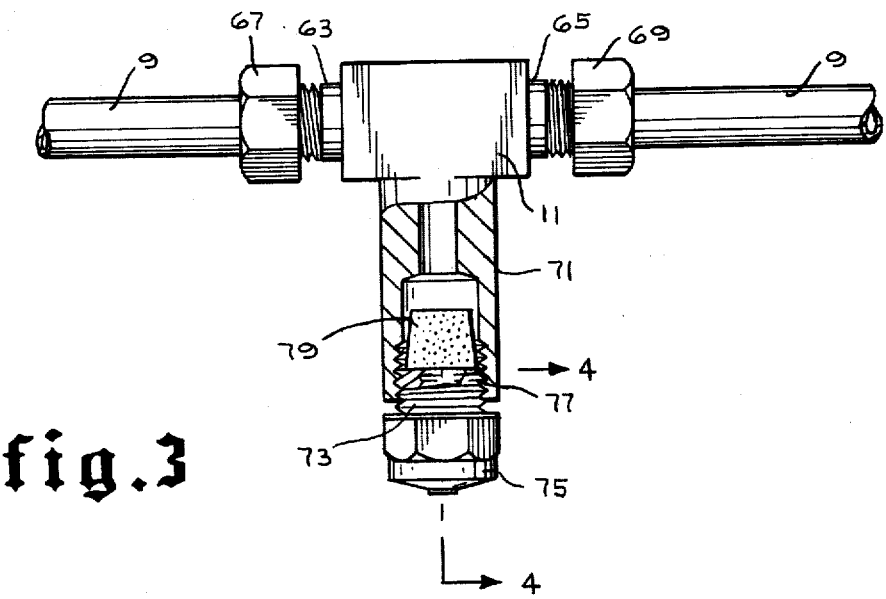
FIG. 3 illustrates, in partial cross section, one of the nozzle assemblies utilized in the apparatus of FIG. 1.

In FIG. 3 there is shown in partial cross section the nozzle assembly for the type used in connection with the invention, along with the nozzle head inserted therein. The nozzle coupling of T-shape variety, as shown, may consist of the coupling end having connections 63, 65 and cooperating draw nuts 67, 69 for receiving the ends of the conduit line 9. It is easily visualized that a nozzle coupling 11 may be inserted into the line 9 at substantially any desirable position by merely severing the plastic line and inserting a coupling 11 so as to achieve desirable insecticide distribution in substantially any area. The insecticide distribution may be terminated in any area similarly by removing the nozzle coupling 11 and inserting a conventional splice coupling or by merely inserting a solid block type nozzle head without an aperture.

Extending in substantial radial direction from conduit line 9 and integrally formed, generally as a part of the coupling end, is the arm 71 having interior threads or other connection means at its distal end for receiving therein the cooperating threaded arm 73 of the nozzle head 75. Integrally affixed to the interior end of nozzle arm 73, such as by cooperating threads 77, is the fine filter means 79. The filter means 79 protrudes upwardly from its mounted end, in cantilever fashion, axially into the coupling arm 71 so as to provide a substantial area through which liquid insecticide is drawn into head 75 through axial bore 81. The fine filter means 79 is characterized by a substantially solid-appearing surface but which has microscopic holes therein through which insecticide is transmitted under pressure. The filter is produced of sintered material preferably porous sintered brass wherein the sintering process has produced microscopic holes on the order of 4–5 microns. Sufficient liquid insecticide is driven through the fine filter means 79 to nozzle head 75 upon the application of sufficient pressure in conduit line 9. It is advisable, however, to provide sufficient surface area in the filter means 79 itself so as to allow adequate liquid insecticide to be received at the nozzle head as explained hereafter under Method of Operation.

Figure 4:
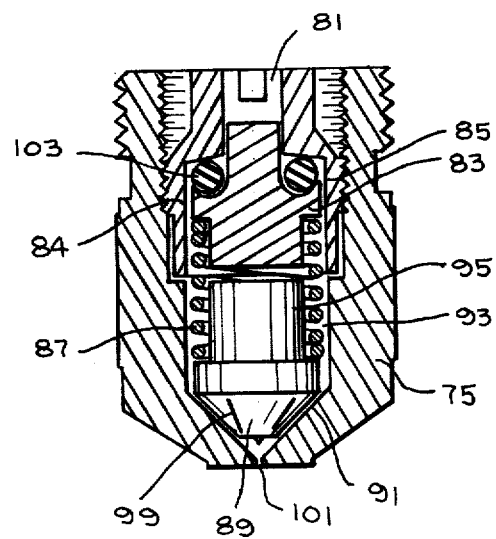
FIG. 4 is a cross section showing the nozzle head along the plane 4—4 of FIG. 3.

In FIG. 4 the nozzle head 75 is shown to consist of a supporting retainer 83, having an axial recess 85 which communicates with axial bore 81. A spring means 87 normally depresses cone 89 against the sloped walls 91 of cavity 93. Affixed to cone 89 is ram arm 95 which is disposed within spring means 87 and restrained away from axial bore 81 through which liquid insecticide enters cavity 93. Cone 89 is characterized by a plurality of radially directed trough or recessed means 99 which extend upwardly from the apex of cone 89 and become increasingly deeper so that liquid insecticide introduced into recess 85 may intercede between the cone 89 and sloped walls 91 in order to overcome the inherent compressive force exerted on the head by spring means 87 and thereby exert a swirling force which lifts the cone 89 in order to allow passage of the insecticide through the nozzle opening 101. A guide O-ring 103 is appropriately disposed about arm 95 so as to rest on the base of cone 89 and thereby insure linear movement of the head within recess 85. The spring means 87 extends rearward to seat against the forward face of the seal ring/spring seat piece 83. An O-ring (not numbered) of appropriate material for the particular liquid being handled is seated against the rear face of the seal ring/spring seat piece 83. The preceding nozzle components are maintained in place by a multiple purpose retaining member 84 threaded into the rear of the nozzle housing. Besides components retention, this member also provides the rear O-ring seal seat, the rear outer spring guide, and the liquid axial bore aperture. When the retainer member 84 has been threaded fully into position, there are exposed nozzle housing internal threads into which the threaded base of the sintered brass filter 79 is joined to restrict contaminants larger than 2 microns in diameter from entering the nozzle housing. Atomized dispersion of liquid insecticide through head 75 is produced by the opening 101 which is of extremely small dimension on the order of 7/1000 of an inch. This opening 101 functions effectively only when foreign matter is effectively precluded from transmission in the system. As explained earlier, initial policing of foreign matter is accomplished by the screen means 33 at the entrance to suction tube 15 which supplies the conduit line 9. Subsequent foreign matter obstructions in the liquid are policed by fine filter means 79 in the nozzle means itself, all as previously explained.

METHOD OF OPERATION

Numerous other features and advantages recited earlier herein accrue as a consequence of the method of operation of the apparatus of the invention. For example, intermittent operation of the apparatus is not only a beneficial incidence of the introduction of chemical insecticide into the entironment of living animals but operates to produce a significant savings in cost of the chemical itself while surprisingly more effectively accomplishing one of the principal objectives, namely, insect and larvae eradication. Intermittent dispersion of the insecticide, in itself, is not nearly so effective as when such dispersion is done through atomization of the insecticide itself because ordinary spraying results in rapid condensation of the insecticide onto surface areas, thus resulting in total absence of insecticide in the atmosphere itself. It is thus readily apparent that certain of the beneficial features and advantages of the present invention accrue as a consequence of an apparatus for atomizing liquid insecticide into an atmosphere on a scheduled and intermittent basis, the schedule of distribution and intermission being dependent upon such factors as the type of animals or birds to be protected against insects, the type of insects (adult flying versus crawling) and larvae which are also the object of the insecticide, atmospheric conditions such as humidity level and temperature within the building and the relative kill rate of the insecticide which might be used within the apparatus.

For exemplary purposes, the system may be actuated by timer 21 to operate for a 60 second cycle every 30 minutes. The timer may, of course, be adjusted or set to operate on any cycle, depending upon the needs in building 5. It may, for example, also be programmed to operate motor 19 and hence pump 13 for a 3 minute cycle every 60 minutes or it may be programmed for a 20 second insecticide distribution cycle every 3 hours. In any event, the operation of timer 21 actuates motor 19 of pump 13 which in turn withdraws liquid insecticide from within container 3 through suction tube 15. The pump 13 may be characterized by a valve (not numbered), see FIG. 1, which provides for a variable flow rate of liquid insecticide into exit conduit 17. Such variable flow rate thereby provides to the system an adjustable line pressure in conduit 9. Preferably this line pressure exists between 180 and 210 pounds per square inch (psi). During the operation cycle the liquid insecticide is, of course, pumped through the conduit line 9 from container 3 and out through each of the nozzle heads 75. The actual display of insecticide within building 5 is determined by the path of line 9 and as indicated earlier can be readily varied when a typical, flexible tubing such as nylon is used. The conduit line 9 is disposed generally above the animals within the building and may be at a height of, for example, 10 to 12 feet. Upon termination of the cycle, as determined by timer 21, the pressure in line 9 begins to deteriorate, dropping rapidly until a pressure of 45 psi is reached. At such pressure, or other predetermined pressure as may be desired, the compressive pressure of spring means 87 in nozzle arm 71 exceeds the line pressure and forces ram head 89 against the sloped walls 91 of the nozzle head, thereby closing nozzle opening 101 in order to produce pressure integrity of line 9 in so far as the nozzles are concerned. The pressure in the line, however, may continue to deteriorate due to drainage of liquids back into supply container 3. There is provided in return conduit 27 the check valve 25. As liquid continues to drain back to container 3, the pressure drops until a level of about 5 psi is reached at which time the check valve 25 closes to thereby produce and insure maintenance of a positive pressure at all times in conduit line 9. The particular pressure at which check valve is actuated is calculated to exceed the head of liquid in the line. Conversely but similarly, there exists in exit conduit 17 an exit check valve 23. The exit check valve 23 permits unidirectional flow of liquid into the conduit line 9 and operates to close promptly upon termination of liquid pumped from pump 13. Thus, independently of the existence of an operational insecticide distribution cycle or the intermission period there between, there is produced a complete hydraulic system and as a consequence thereof, the actuation of pump 13 by timer mechanism 21 produces a substantially immediate response of insecticide distribution from the nozzles. Such actuation of the pump 13 promptly elevates the positive head pressure because the existence of a full line of liquid, and the incompressable character of the liquid itself, moves the pressure to the operational level immediately. Cone 89 is adapted to open upon the introduction of approximately 100 pounds per square inch by reason of the opposing spring pressure. Recess means 99 are designed to permit withdrawal of the cone 89 at such pressure.

In summary, it will be recognized that the present apparatus provides for operation of the system within a number of operational parameters. The pressure may be varied through means of the valve at pump 13. The time of operation may be adjusted by timer 21. Likewise the sequencing time may be controlled. Also, the concentration of insecticide within container 3 may be varied and the placement of nozzles within the building 5 may produce a varying display. Pressure integrity in the system substantially eliminates build-up time for operational pressure. The drive means in the form of motor 9 is protected against damage by the switch mechanism within container 3, thereby insuring not only a reliable operational system for the distribution of liquid insecticides within the building but a system which protects itself against damage when insecticide is depleted from container 3.

It will be recognized that the apparatus and method described herein above may be varied within the parameters set forth to accomplish the stated objectives without departing from the spirit and scope of the claims appended hereto, and within the meaning of the specification hereinabove.

Therefore, that which is claimed and desired to be secured by United States Letters Patent is:

1. In an insecticide distribution apparatus for automatically dispersing insecticide fluid periodically in an atomized state over a predetermined area of display substantially instantaneously upon the actuation thereof:

a conduit line for carrying the insecticide fluid, nozzle means affixed in fluid communicating relation to said line for atomizing and dispersing the fluid that flows periodically therethrough into the surrounding atmosphere, first fluid pressure means communicating with said line for maintaining a positive fluid pressure therein during the intervals when said nozzle means are not periodically dispersing the fluid, second fluid pressure means communicating with said nozzle means for emitting fluid through said nozzle means only when the line pressure is above a predetermined level, such predetermined level being higher than the positive pressure maintained by said first fluid pressure means, and intermittently actuated pumping means for supplying insecticide fluid to said conduit line, said pumping means and first and second fluid pressure means cooperating to produce an instantaneous atomized fluid dispersion at regular periods from said nozzle means and without any fluid or pressure loss in said line during the intervals therebetween when the line pressure is maintained by said first fluid pressure means.

2. The apparatus of claim 1 including a supply container for storing the insecticide fluid, said line being in fluid communication with said container and switch means for deactivating said pumping means when the fluid in the container is substantially depleted so as to prevent damage to the pumping means and provide for monitor-free operation of the apparatus.

3. The apparatus of claim 1 including a supply container for storing the insecticide fluid; the line being in fluid communication with said container, said first fluid pressure means being operatively disposed in the apparatus to maintain the positive pressure in the line but not the container.

4. The apparatus of claim 2 wherein said line includes exit and return conduits communicating with said container.

5. The insecticide distribution apparatus of claim 1 wherein said nozzle means comprises a nozzle head having a cavity therein, said cavity being characterized by an internal wall means which slopes toward a common point, a nozzle opening communicating with the common point so that fluid within the nozzle means escapes through the nozzle opening, ram means residing within the cavity and configured to abut the internal wall means so as to preclude escape of fluid through said nozzle opening, and recess means between the ram means and internal wall means for receiving fluid pressure therein to facilitate separation of the ram means and wall means to thereby expose the nozzle opening.

6. The apparatus of claim 5 wherein there is disposed a spring means in biasing relation to said ram means for urging said ram means against the internal wall means with a predetermined magnitude of force.

7. The apparatus of claim 6 wherein the magnitude of force of said spring means is greater than the magnitude of force produced by said first fluid pressure means so as to thereby preclude leakage from said nozzle means while maintaining instantaneously fluid dispersion capability due to the positive pressure in the conduit line.

8. The apparatus of claim 7 wherein the apparatus includes a fine filter means disposed in fluid flow communication with the nozzle opening, the fine filter means being characterized by microscopic filter openings, each of which is smaller than the nozzle opening so as to thereby insure against obstruction of the latter by a foreign particle in the fluid.

9. The apparatus of claim 8 wherein the fine filter means is mounted within the nozzle head and supported therein independently of said ram means so that the latter is movable while the former is stationery at all times.

10. The apparatus of claim 9 wherein said fine filter means is of closed-end cylindrical configuration so as to provide for substantial filtering surface area, said filtering surface area being constructed of a sintered metal to thereby achieve micron-scale filtering ability.

11. The apparatus of claim 10 wherein the nozzle opening is of sufficiently small dimension to produce an atomized dispersion of fluid therefrom.

12. In a fluid distribution apparatus, the improvement comprising a conduit line for transmitting the fluid from a supply source to a nozzle means, a supply source of fluid and pump means for moving the fluid therefrom to the conduit line, timing means for actuating the pump means on an intermittent schedule, and valve means communicating with said conduit line for maintaining a positive pressure therein when the pump means is not operating, and nozzle means in fluid communication with said conduit line for transmitting the fluid to the environment when the pump means is operating.

13. The apparatus of claim 12 wherein the nozzle means includes an internally mounted ram means for precluding leakage of the fluid when the pump means is not operating even though a positive line pressure is maintained.

* * * * *